United States Patent Office 3,812,075
Patented May 21, 1974

3,812,075
PROCESS FOR THE PRODUCTION OF A DISPERSION OF A POLYMER IN AN ORGANIC LIQUID
Marion Burdett, Wokingham, and Derek John Walbridge, Beaconsfield, England, assignors to Imperial Chemical Industries Limited, London, England
No Drawing. Filed Nov. 22, 1971, Ser. No. 201,206
Int. Cl. B01f 3/12; C08f 45/28, 47/20
U.S. Cl. 260—33.60 A                    7 Claims

ABSTRACT OF THE DISCLOSURE

A dispersion of a polymer of one or more vinyl or vinylidene monomers in a non-solvent organic liquid is stabilized by carrying out the polymerization of the monomers in the liquid in the presence of a stabilizer precursor obtained by alkylating a melamine formaldehyde resin and reacting it with a reagent having a double bond copolymerizable with the monomer and also having a group capable of undergoing a condensation reaction with the melamine formaldehyde resin.

---

This invention relates to dispersions of polymers in organic liquids and to coating compositions prepared therefrom. The invention also relates to a process for the preparation of the dispersions and to dispersion stabilizer-precursors therefor.

British Pat. 1,134,997 discloses a process in which a butylated melamine formaldehyde reaction product is used in the production of a polymer dispersion. In one example a butylated melamine formaldehyde resin is dissolved in cyclohexane and a mixture of methyl methacrylate and hydroxypropyl methacrylate is copolymerized in the solution to form a dispersion of copolymer in cyclohexane. A relatively coarse dispersion is obtained and rather high proportions of melamine formaldehyde and hydroxypropyl methacrylate are required.

We have found that a process using melamine formaldehyde resin but otherwise different from that described in British Pat. 1,134,997 may be advantageously employed.

Accordingly the present invention provides a process for the production of a dispersion of a polymer in an organic liquid comprising (1) alkylating a melamine formaldehyde resin and pre-reacting it with a pre-reaction reagent having a copolymerizable double bond and a group capable of undergoing a condensation reaction with the melamine formaldehyde resin so as to produce a copolymerizable alkylated melamine formaldehyde reaction product which acts as a dispersion stabilizer precursor, and subsequently (2) polymerizing one or more vinyl or vinylidene monomers free from functional hydroxyl and carboxyl groups in the presence of a solution of the stabilizer precursor in an organic liquid in which the polymer formed from the said monomer or monomers is insoluble.

The pre-reaction of the melamine formaldehyde resin may be performed before, simultaneously with, or after the alkylation of the resin provided that at least a major part of the pre-reaction is completed before the final dispersion polymerization. Good results have been obtained by first alkylating the melamine formaldehyde resin and then prereacting the alkylated product in a separate stage prior to the final polymerization.

Other possibilities are simultaneous alkylation and pre-reaction or pre-reaction immediately before the final polymerization and in the same reaction medium.

The stabilizer precursor may be further reacted in solution prior to the final polymerization stage with vinyl or vinylidene monomer free from functional hydroxyl and carboxyl groups similar to that used in the final polymerization stage so as to produce a pre-formed stabilizer for the dispersed particles of polymer.

It is believed, although the utility of the present invention does not depend on the correctness of this belief, that the monomer reacts with the stabilizer precursor so as to form a stabilizing molecule, one part of which can associate with the dispersed polymer particles and another part of which can be solvated by the organic liquid. By forming the precursor and optionally also the stabilizer before the final polymerization, greater control is achieved over the properties of the stabilizer and hence over the properties of the dispersion which is ultimately obtained.

Some of the pre-reaction reagent may be present as a co-monomer in the final polymerization, leading to the production of a dispersion of a copolymer of the pre-reaction reagent and the vinyl or vinylidene monomer which is free from functional hydroxyl and carboxyl groups. The pre-reaction reagent may be an excess from the pre-reaction stage or may be added separately at a later stage.

A preferred feature of the invention is the use of an organic liquid in the final polymerization which contains at least a major proportion of aliphatic hydrocarbon and in which the dispersed polymer is insoluble. Advantageously the organic liquid employed is selected from heptane, iso-octane, nonane, decane, cyclohexane, i.e. straight, branched or cyclic saturated aliphatic hydrocarbons. A mixture of petrols of different boiling points is conveniently used. Alkanols such as butyl up to lauryl or stearyl alcohol may be included. The amount of organic liquid employed can be widely varied but should be a good solvent for the alkylated melamine formaldehyde reaction product and provide an easily manageable polymerization medium.

The alkylated melamine formaldehyde resin used herein is usually a butylated melamine formaldehyde condensate although the alkylated derivatives obtained with alcohols higher or lower than butanol, e.g. lauryl alcohol, can in certain cases be advantageously used. Such condensates are well known in the coating art and conventional procedures may be used for preparing them. Generally speaking, the alkylated melamine formaldehyde condensates used in the present process are characterized by relatively high naphtha tolerances, i.e. at least 15 and preferably of the order of 200 and above.

Examples of a pre-reaction reagent having a copolymerizable double bond and a group capable of condensation with melamine formaldehyde resin include acrylic or methacrylic monomers containing at least one functional hydroxyl and/or carboxyl groups, e.g. the hydroxy alkyl acrylates or methacrylates, particularly hydroxpropyl methacrylate, 2-hydroxyethyl methacrylate, the corresponding acrylates, acrylic acid, methacrylic acid and mixtures of two or more of these. Additional examples include acrylamide, methacrylamide, cyclic unsaturated acid anhydrides (e.g. maleic anhydride and itaconic anhydride), allyl alcohol, t-butylaminoethyl methacrylate, acryloyl halides, acrolein and unsaturated fatty acids.

A wide variety of vinyl or vinylidene monomers which are free from functional —OH and —COOH groups, or mixtures of such monomers may be used as a monomeric component in the final polymerization stage. Typical examples of such monomers are the alkyl acrylates and methacrylates, styrene, acrylonitrile and acrylamide. Specific illustrations are the esters of methacrylic acid and acrylic acid with alkanols, e.g. ethyl acrylate, 2-ethyl hexyl acrylate, butyl acrylate, methyl methacrylate and butyl methacrylate.

The final polymerization of the invention is advantageously carried out by gradually adding the monomer components to a solution of the alkylated melamine formaldehyde condensate in an organic liquid as previously described, in the presence of a suitable free radical catalyst. Polymerization temperatures and times may be widely varied depending on the type of catalyst and on the other conditions. Where free radical initiators alone are employed, for example azobisisobutyronitrile, peroxides such as lauroyl peroxide and benzoyl peroxide and hydroperoxides such as cumene hydroperoxide, temperatures in the range 40–85° C. and times varying from 1–10 hours or more may be mentioned as representative. Alternatively, by use of a redox-type catalyst combination, such as benzoyl peroxide with dimethyl aniline, cumene hydroperoxide with p-toluene-sulphinic acid or dodecyl mercaptan, or t-butyl hydroperoxide with dodecyl mercaptan and iron naphthenate, temperatures of from −10° to 40° C. may be employed, thereby avoiding any risk of premature crosslinking of the alkylated melamine formaldehyde resin.

The present invention also provides dispersions, dispersion stabilizers and stabilizer precursors when made by the processes according to the invention.

The dispersions of the invention are useful in the preparation of coating compositions which may also contain pigments, fillers or extenders conventional in the art.

The proportions of the components in the dispersions of the present invention may vary considerably. The pre-reaction reagent may for example form from 0.1–60 wt. percent of the total weight of the pre-reaction reagent and vinyl or vinylidene monomer free from functional hydroxyl and carboxyl groups taken together.

The copolymerizable alkylated melamine formaldehyde reaction product may be present in the ratio of 1–60 wt. percent of the dispersed polymer (excluding melamine formaldehyde).

In general the degree of crosslinking in the final product increases with the content of melamine formaldehyde and also in some cases with the content of pre-reaction reagent (e.g. hydroxypropyl methacrylate). Molecular weight of the dispersed polymer may vary widely and is typically in the range up to 150,000.

A typical thermoplastic polymer would be predominantly methyl methacrylate with up to 20% of plasticizers such as ethyl, butyl or 2-ethylhexyl acrylate incorporated to give a molecular weight of approximately 100,000.

A typical thermosetting composition contains 20–40% styrene, 20–70% methyl methacrylate, 5–20% hydroxypropyl methacrylate or hydroxyethyl methacrylate, and 1–5% 2-ethyl hexyl or butyl acrylate of molecular weight approximately 50,000–75,000.

Dispersions of the present invention may typically contain approximately 50–55% solids.

Using the process of the present invention it is found that smaller quantities of melamine formaldehyde resin may be used in the preparation of the dispersions. This gives greater flexibility in the formulation of paints and other coating compositions since additional quantities of more reactive melamine formaldehyde resin can be added at a later stage in the preparation of the compositions giving greater control over crosslinking. It is also found that lower levels of methacrylic and acrylic monomers having functional hydroxyl and carboxyl groups can be used, thus reducing the consumption of expensive starting materials in thermoplastic compositions. In certain cases finer and more stable dispersions are obtained.

Examples of the invention will now be described; parts are by weight.

EXAMPLE 1A

A butylated melamine formaldehyde resin was prepared as follows.

A mixture of melamine (1080 parts), butyl formaldehyde (3780 parts), butyl alcohol (840 parts), xylene (300 parts), phthalic anhydride (1.8 parts) and formic acid (10 parts) was heated in a flask fitted with a stirrer, thermometer, and condenser. Water of reaction (958 parts) was removed by azeotropic distillation over a period of 2½ hours at a reaction temperature of 102° C. The resulting product had a cyclohexane tolerance of 29.5 ml. per gm. of resin, and a viscosity of approximately 60 poises at 70% non-volatile content.

By butyl formaldehyde we mean a solution of formaldehyde in butyl alcohol of the following composition by weight:

| | Percent |
|---|---|
| Formaldehyde | 40±½ |
| Water | 7±½ |
| n-Butyl alcohol | 52–54 |

EXAMPLE 1B

The butylated melamine formaldehyde resin of Example 1A was used in the preparation of a polymer dispersion as follows:

Melamine formaldehyde resin prepared in Example 1A (240 parts) was mixed with hydroxypropyl methacrylate (60 parts), petrol of boiling range 70–85° C. (359.8 parts), and petrol of boiling range 138–165° C. (40 parts) and charged to a flask fitted with a stirrer, thermometer and recycle condenser. The charge was heated to reflux for half an hour and then a mixture of methyl methacrylate (240 parts), hydroxypropyl methacrylate (60 parts) and lauroyl peroxide 7.2 parts was added continuously over a period of 4½ hours. The dispersion was kept under reflux for a further half an hour. The product was a viscous, creamy dispersion of fine particles 0.1–0.4 micron in diameter.

EXAMPLE 2

A butylated melamine formaldehyde resin prepared as in Example 1A was used in the preparation of a polymer dispersion as follows. Melamine formaldehyde resin at 70% solids content (171 parts), petrol of boiling range 70–85° C. (359.8 parts), petrol of boiling range 138–165° C. (40 parts) and hydroxypropyl methacrylate (60 parts) was charged to a flask fitted with a stirrer, thermometer and recycle condenser. The charge was heated to reflux for one hour and thereafter a solution of lauroyl peroxide (7.2 parts) in methyl methacrylate (240 parts) was added continuously over a period of 4½ hours. The dispersion was kept at reflux for a further half an hour. The product was a fluid dispersion of fine particle size 0.1–0.4 micron diameter. The polymer solids content was 44% representing a 96% conversion of monomer to polymer.

EXAMPLE 3A

The butylated melamine formaldehyde resin of Example 1A was modified with hydroxypropyl methacrylate as follows.

To 1000 parts of the resin, hydroxypropyl methacrylate (20.6 parts) was added. The reaction mixture was heated and butanol (10.6 parts) and water (3 parts) were removed by distillation. The resulting resin had a cyclohexane tolerance of 46.7 ml. per gm. resin and a resin content of 64%.

EXAMPLE 3B

A dispersion was prepared using the resin of Example 3A. Melamine formaldehyde resin from Example 3A (50 parts) was mixed with petrol of boiling range 70–85° C. (358.9 parts), petrol of boiling range 138–165° C. (40 parts) and butanol (10 parts). This was charged to a flask fitted with a stirrer, thermometer and recycle condenser, and heated to reflux. Thereafter a mixture of methyl methacrylate (240 parts), lauroyl peroxide (7.2 parts) and butanol (30.0 parts) was added continuously over a period of 3½ hours. The dispersion was kept under reflux for a further half an hour. The product was a fluid dispersion of particles up to 0.7 micron in size.

EXAMPLE 4

A paint was made up from a polymer dispersion prepared according to the process of the present invention as follows.

A mill base of the following composition was made up and rolled in a ball mill for 24 hours. Rutile titanium dioxide (300 parts), Bentone (1.6 parts), polymeric pigment dispersant (42 parts of a 30% solution) plasticizer, butyl benzyl phthalate (208 parts).

This mill base was used in a paint of the following composition. Mill base (27.6 parts), dispersion prepared as in Example 2 (66.3 parts), petrol of boiling range 70–85° C. (5.5 parts), solution of 2% silicone oil in petrol of boiling range 138–165° C. (0.6 part).

This paint was thinned with a mixture of high boiling petrol and xylol (90 parts to 70 parts) in the ratio 90:16 paint to thinner, and was sprayed onto undercoated panels in a double pass.

The films were fully integrated and showed excellent adhesion and gloss.

EXAMPLE 5A

A butylated melamine formaldehyde resin was prepared as follows.

A mixture of melamine (345 parts), formalin (1340 parts of a 36% solution), butyl alcohol (880 parts), xylene (50 parts), solvent blend (626 parts—consisting of butyl alcohol (68.7%), water (9.5%), xylene (13.0%) and formalin (8.8%)) and formic acid to adjust the pH to 4.9 was heated in a flask fitted with a stirrer, thermometer, Dean and Stark separator and condenser. Water of reaction (900 parts) was removed by azeotropic distillation over a period of 1¾ hours at a reaction temperature of 92–96° C. The product was cooled to 88° C. and methacrylic acid (69 parts) was added. The mixture was raised to reflux and water of reaction (100 parts) and solvent distillate (686 parts) were removed. The product, after cooling and thinning with xylene (280 parts), had a 59.5% non-volatile content.

EXAMPLE 5B

The pre-reacted butylated melamine formaldehyde resin of Example 5A was used in the preparation of a polymer dispersion as follows.

Melamine formaldehyde resin from Example 5A (1.0 part) was mixed with petrol of boiling range 70–85° C. (60 parts), isopropyl alcohol (7 parts), methyl methacrylate (19.0 parts), ethyl acrylate (1.0 parts) and azodiisobutyronitrile (0.2 part) in a flask fitted with a thermometer, stirrer and condenser. The mixture was raised to reflux (approximately 71°) and maintained under reflux for 2 hours. A stable, fine particle size polymer dispersion was obtained; the conversion of monomer to polymer was 96%.

EXAMPLE 6A

A pre-reacted butylated melamineformaldehyde resin was prepared using a similar method to that of Example 5A with the exception that the methacrylic acid was replaced by an equal weight of acrylamide. A total of 1610 parts of water and solvent was removed and the product had a final non-volatile content of 62.7%.

EXAMPLE 6B

The pre-reacted butylated melamine formaldehyde resin of Example 6A was used in the preparation of a polymer dispersion by the method of Example 5B, using the same proportion of resin to monomers as described therein.

A fine particle size, fluid polymer dispersion was obtained (76% conversion of monomers after 2 hours).

EXAMPLE 7A

A butylated melamine formaldehyde resin was prepared as follows. A mixture of melamine (118 parts), formalin (458 parts of a 36% solution), butyl alcohol (280 parts), xylene (17 parts), the solvent blend described in Example 5A (73.1 parts), allyl alcohol (27.2 parts) and formic acid to adjust the pH to 4.8 was heated in a flask fitted with a stirrer, thermometer, Dean and Stark separator and condenser. Water of reaction (394 parts) and solvent distillate (120 parts) were removed over a period of 2½ hours at a reaction temperature of 92–116° C. The product had a non-volatile content of 51.4%.

EXAMPLE 7B

The pre-reacted butylated melamine formaldehyde resin of Example 7A was employed in the preparation of a polymer dispersion by the method described in Example 5B.

A fine particle size, fluid dispersion was obtained (81% conversion of monomers after 2 hours).

EXAMPLE 8

The pre-reacted butylated melamine formaldehyde resin of Example 7A was employed in the preparation of a polymer dispersion by the method of Example 5B except that di-(4-t-butylcyclohexyl)peroxydicarbonate was used in place of azodiisobutyronitrile and hexane was used in place of the petrol of boiling range 70–85° C.

A fluid, fine particle size dispersion resulted.

What we claim is:

1. A process for the production of a dispersion of a polymer in an organic liquid comprising the steps of (1) alkylating a melamine/formaldehyde resin to give a product having a naphtha tolerance of at least 15 and pre-reacting the said product with a polymerizable pre-reaction reagent selected from the group consisting of acrylic and methacrylic acids and their acid halides, acid amines and hydroxylalkyl and substituted aminoalkyl esters, cyclic unsaturated acid anhydrides, acrolein, allyl alcohol and unsaturated fatty acids, so as to produce a copolymerizable alkylated melamine/formaldehyde reaction product which acts as a dispersion stabilizer precursor, and subsequently (2) polymerizing one or more vinyl or vinylidene monomers free from functional hydroxyl and carboxyl groups in the presence of a solution of the stabilizer precursor in an organic liquid containing at least a major proportion of aliphatic hydrocarbon in which the polymer formed from the said monomer or monomers is insoluble but which is a good solvent for the said stabilizer precursor, the pre-reaction reagent forming from 0.1% to 60% of the total weight of the pre-reaction reagent and the vinyl or vinylidene monomer or monomers used in step (2) and the said stabilizer precursor being present in the ratio of 1% to 60% of the weight of the dispersed polymer.

2. A process as claimed in claim 1, wherein the melamine formaldehyde resin is first alkylated and then pre-reacted in a separate stage prior to the final polymerization of the monomer or monomers.

3. A process as claimed in claim 1, wherein the stabilizer precursor is reacted in solution prior to the final polymerization stage with vinyl or vinylidene monomer free from functional hydroxyl and carboxyl groups similar to that used in the final polymerization stage so as to produce a pre-formed stabilizer.

4. A process as claimed in claim 1, wherein the pre-reaction reagent is present as a co-monomer in the final polymerization together with the vinyl or vinylidene monomer free from functional hydroxyl and carboxyl groups.

5. A process as claimed in claim 1, wherein the alkylated melamine formaldehyde resin is a butylated melamine formaldehyde condensate.

6. A process as claimed in claim 1, wherein the pre-reaction reagent is selected from hydroxypropyl methacrylate, methacrylic acid, acrylamide and allyl alcohol.

7. A process as claimed in claim 1, wherein the vinyl or vinylidene monomer free from functional hydroxyl and carboxyl groups is methyl methacrylate.

References Cited

UNITED STATES PATENTS

| | | | |
|---|---|---|---|
| 3,020,255 | 2/1962 | Margrane et al. | 260—856 |
| 3,396,209 | 8/1968 | Sekmakas et al. | 260—856 |
| 3,539,661 | 11/1970 | Rauch-Pontigam | 260—856 |
| 3,317,635 | 5/1967 | Osmond | 260—34.2 |
| 3,365,414 | 1/1968 | Fisk et al. | 260—34.2 |
| 3,607,821 | 9/1971 | Clarke et al. | 260—33.6 R |

FOREIGN PATENTS

| | | | |
|---|---|---|---|
| 628,150 | 8/1949 | Great Britain | 260—856 |
| 211,109 | 10/1957 | Australia | 260—856 |
| 653,193 | 3/1965 | Belgium | 260—856 |

ALLAN LIEBERMAN, Primary Examiner

U.S. Cl. X.R.

260—33.4 R, 33.6 R, 34.2, 856

UNITED STATES PATENT OFFICE
CERTIFICATE OF CORRECTION

Patent No. 3,812,075  Dated May 21, 1974

Inventor(s) Marion BURDETT et al

It is certified that error appears in the above-identified patent and that said Letters Patent are hereby corrected as shown below:

Insert the following information:

[30] Foreign Application Priority Data

November 27, 1970  Great Britain  56467/70

Signed and sealed this 7th day of January 1975.

(SEAL)
Attest:

McCOY M. GIBSON JR.
Attesting Officer

C. MARSHALL DANN
Commissioner of Patents